Jan. 4, 1944.                J. R. TENCH                2,338,467
                      CHANNELED METALLIC STRUCTURE
                          Filed May 15, 1942
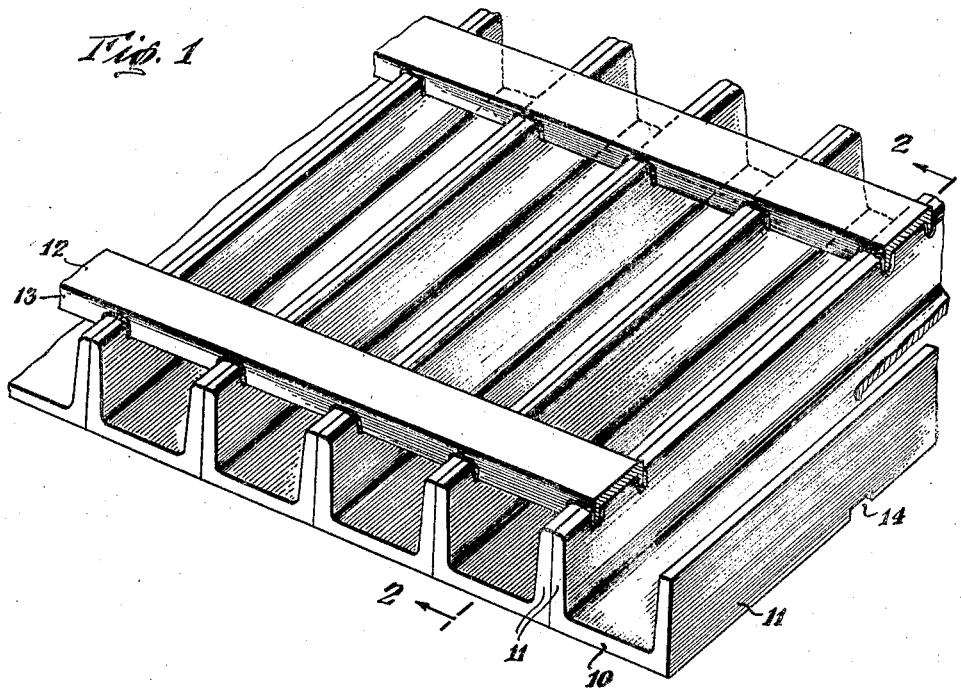
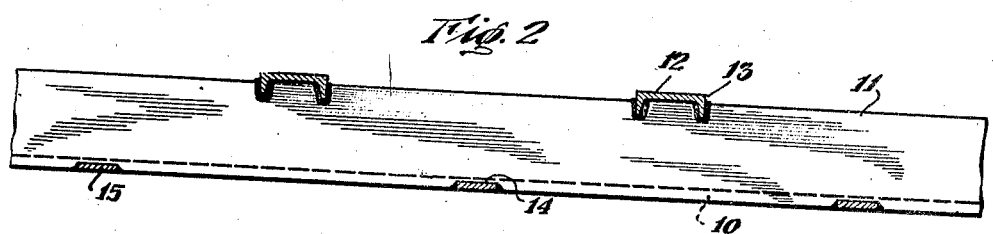
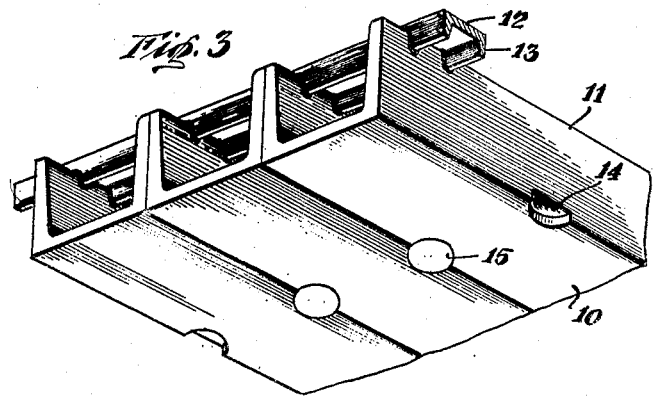
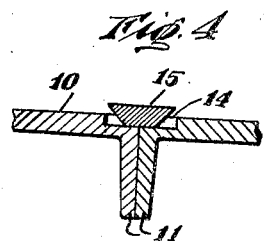
INVENTOR.
BY John R. Tench
Townsend + Decker
ATTORNEYS Patented Jan. 4, 1944

2,338,467

UNITED STATES PATENT OFFICE 2,338,467

CHANNELED METALLIC STRUCTURE

John R. Tench, Croton on Hudson, N. Y.

Application May 15, 1942, Serial No. 443,049

6 Claims. (Cl. 189—34)

The principal object of this invention is the production of a metal structure of a maximum strength and durability and adapted to resist force or pressure applied in any direction or to sustain heavy loads without bending, buckling or collapsing and without disjuncture of the component parts comprising the structure or the fracture of such parts or any of them.

A further object of the invention is the production of a metal structure having the above characteristics which shall comprise channel members, preferably of conventional form, connected together in such manner as to produce a unitary, rigid and integral unit, the outer face or side of which has a substantially smooth and uninterrupted surface formed by the outer surfaces of the webs of the channels while the inner side provides protective or shielded pockets or troughs intermediate the legs or flanges of the channels and suitable for the reception of any number of various devices or parts employed in structural metal construction or suitable for the reception of concrete or other filling material.

A further object of the invention is the production of a metal structure having the above characteristics which may be conveniently manufactured with facility and expedition and which may be used efficaciously in a variety of structural work of varying character such as walls, partitions, foundations, floors, roofs, girders, beams, trusses and other uses where great strength and rigidity are vital requirements.

Still a further object of the invention is the production of a metal structure of the above character constructed with standard parts only which are easily procurable thus making unnecessary the manufacture of special parts and the building or manufacture of machines, tools and equipment for producing those special parts.

In the accompanying drawing which illustrates a practical embodiment of the invention:

Fig. 1 is perspective view of a portion of the inner side of a channeled metal structure of the invention.

Fig. 2 is a section on the line 2—2 of Fig. 1.

Fig. 3 is a perspective view of the outer side of a portion of the structure, and Fig. 4 is a sectional detailed view of a portion of two of the channels in opposed relation prior to a welding operation about to be described.

Referring to the several figures of the drawing:

The body of the structure comprises preferably a plurality of rolled channels of standard size and construction, the webs of which are indicated at 10 and the legs or flanges of which are indicated at 11. These channels are assembled in apposition to each other with the outer surface of a leg or flange of one channel closely engaging the outer surface of the leg or flange of the next succeeding channel to form a series of double-walled open troughs, as illustrated, and with the webs of all the channels lying in the same plane whereby the structure as a whole will present a smooth and uninterrupted outer surface all as more clearly shown in Fig. 3.

The channels just described are rigidly connected together by transverse tying or connecting members which themselves also preferably comprise rolled channels having webs 12 and legs or flanges 13 and are of standard size and construction. Said connecting channels are spaced from each other and, by preference, are of appreciably smaller size than the size of the channels forming the body of the structure. The tying connecting channels are homogenously and integrally united with the body channels by superimposing the tying channels on the body channels and transversely thereof with the lower edges of the legs or flanges of the tying channels engaging the upper edges of the legs or flanges of the body channels. Heating electric current is then passed through the members at their points of intersection and pressure is applied simultaneously in accordance with the now well-known electric resistance welding process and the flanges of the tying channels are forced downwardly within and are welded to the opposed flanges of the body channels and the operation is continued preferably until the webs of the tying flanges closely engage the upper edges of the flanges of the body channels all as more clearly shown in Fig. 1 whereby the webs of the tying channels are spaced from the webs 10 of the first-mentioned channels in the finished structure.

The manner of assembling the parts for interconnection as above described is an ideal one for practicing the electric welding resistance process in that the points of engagement of the elements to be welded together are relatively of small area which localizes the electric current and makes a large amount thereof unnecessary for the welding operation thus effecting a considerable saving in the manufacturing operation. Also, inasmuch as a four-point contact is made at the intersections of the opposed members, the strength of the welded joints is enhanced so that they are resistant to any tendency to relative rotation or to disconnection should a defective weld result from the manufacturing operation. Any suitable form of dies, clamps and electrodes or machines may be employed for the electric welding operation and these form no part of the present invention. As will be manifest, however, the connecting together of the body channels in the manner described and by joints of such strength makes it practically impossible to separate the body channels one from the other as they and the transverse channels have become an integral, composite structure.

To further strengthen the structure and to prevent any possible but improbable spreading of the body channels at their lower meeting edges or their edges lying adjacent their webs I prefer to provide each channel adjacent its lower edge with a groove 14, preferably semi-circular in configuration and as shown, which registers with a similarly formed and shaped groove in the next succeeding channel of the series to form a circular groove which receives a welding connecting button 15. This button is preferably substantially cone-shaped or tapered, as shown, but its maximum and upper diameter is such as to make it snugly interfit with the circular groove while the diameter of its lower end which bridges the meeting edges of opposed body channels is more restricted. The buttons have a normal thickness greater than the depth of the groove to compensate for the loss of metal occasioned by its tapered configuration so that the grooves will be entirely filled with metal after the buttons have been welded therein.

The electric resistance welding process is also preferably employed for welding the buttons 15 within the grooves 14. The buttons are seated within the grooves as shown in Fig. 4 whereby they bridge the meeting edges of the opposed body channels and heating electric current is passed through the buttons and channels while pressure is simultaneously applied to weld the buttons to the channels and within the grooves and thus securely and rigidly connect the meeting edges together. By tapering the buttons the lower ends thereof are of restricted size which obviously facilitates the welding operation as the welding current is thus localized, but after the welding operation has been completed, the grooves are entirely filled with the fused metal of the buttons because of their increased thickness as hereinbefore referred to. After the buttons have been welded within their respective grooves, the outer surface of the structure is smooth and uninterrupted in character. As shown, and for obvious reasons, I prefer to stagger the positions of the grooves 14 as respects the positions of the transverse tying channels.

Among the uses for which the invention might be employed is that as a wall for a bomb-proof shelter so that a missile penetrating the wall would be limited in its destructive effects as the flanges 11 of the body channels would act to confine the missile or flying fragments or splinters to greatly localized and confined areas. Were the spaces or troughs formed by said flanges filled with concrete, it is obvious that a solid and massive wall of very great strength would result which would be substantially impenetrable.

The invention claimed is:

1. A metallic structure comprising a series of rolled channels each having a web and flanges integral therewith, said channels being arranged in sidewise relation to each other with a flange of one channel closely engaging a flange of the next succeeding channel and each channel being provided with a semi-circular shaped groove registering with a similarly shaped groove in the next succeeding channel to form a circular groove, transverse connecting members spaced from each other and connected to the edges of said flanges and welding buttons welded within the circular grooves to connect the meeting edges of the channels together adjacent their webs and providing a smooth uninterrupted outer surface for the structure.

2. A metallic structure comprising a series of channels each having a plate-like web and undeformed plate-like flanges integral therewith, said channels being arranged in sidewise relation to each other with a flange of one channel closely engaging a flange of the next succeeding channel to provide a series of double-walled open troughs, said webs lying in substantially the same plane with each other and with the lower ends of their flanges, transverse tying members each having a plate-like web and flanges integral therewith comprising plate-like members forming spaced substantially parallel walls the free edges of which are welded to and within the free edges of the flanges of said first-named channels by pressure electric resistance welding to integrally connect said double-walled troughs together and connecting means welded within the webs and flanges of adjacent of said first-named channels by pressure electric resistance welding.

3. A metallic structure comprising a series of channels each having a web and spaced flanges integral therewith, said channels being arranged in sidewise relation to each other with a flange of one channel closely engaging a flange of the next succeeding channel substantially throughout the depths of the channels to form a series of open double-walled troughs and each channel being provided with a walled groove in its web and a flange thereof, said groove registering with the walled groove formed in the web and flange of the next succeeding channel, transverse connecting members welded to the free edges of said flanges to integrally connect said double-walled troughs together and connecting elements bridging adjacent channels and welded within said registering grooves by pressure electric resistance welding to connect said channels together at their lower edges adjacent their webs and providing a substantially smooth uninterrupted outer surface for the structure.

4. A metallic structure comprising a series of channels each having a plate-like web and upstanding plate-like flanges integral therewith, said channels being arranged in sidewise relation to each other with a flange of one channel closely engaging a flange of the next succeeding channel substantially throughout the depths of the channels to form a series of open troughs, transverse channels each having a web and flanges integral with said web providing spaced plate-like members forming substantially parallel walls the free edges of which are welded to the free edges of the flanges of said first-named channels with the webs of said transverse channels engaging the unwelded edges of the flanges of said first-named channels and connecting elements welded within the webs and flanges of said first-named channels by pressure electric resistance welding to prevent spreading of said channels at their meeting edges adjacent their webs.

5. A metallic structure comprising a series of channels each having a plate-like web and spaced upstanding plate-like flanges integral therewith, said channels being arranged in sidewise relation to each other with a flange of one channel closely engaging a flange of the next succeeding channel substantially throughout the depths of the channels to form a plurality of open double-walled troughs, transverse channels each comprising a web and flanges integral therewith having free edges welded to and within the edges of the flanges of said first-named channels and connecting elements connecting said first-named channels together at their edges adjacent their webs and welded within said webs and their flanges by pressure electric resistance welding and spaced from each other in staggered relation to said transverse channels.

6. A metallic structure comprising a series of channels each having a flat plate-like web and upstanding plate-like flanges integral therewith, said channels being arranged in sidewise relation to each other with a flange of one channel closely engaging a flange of the next succeeding channel to form a series of open double-walled troughs and each channel being provided with a semicircular shaped groove registering with a similarly shaped groove in the next succeeding channel to form a substantially circular groove, transverse tying members connected to the edges of said flanges to hold said open double-walled troughs in close engagement and welding buttons welded within the circular grooves to prevent spreading of the meeting edges of the channels adjacent their webs.

JOHN R. TENCH.